(12) United States Patent
Hirst

(10) Patent No.: US 6,926,284 B2
(45) Date of Patent: Aug. 9, 2005

(54) SEALING ARRANGEMENTS

(75) Inventor: Robert Hirst, Chellaston (GB)

(73) Assignee: Alstom Technology Ltd., Baden (CH)

( * ) Notice: Subject to any disclaimer, the term of this patent is extended or adjusted under 35 U.S.C. 154(b) by 12 days.

(21) Appl. No.: 10/732,587

(22) Filed: Dec. 10, 2003

(65) Prior Publication Data
US 2004/0173975 A1 Sep. 9, 2004

(30) Foreign Application Priority Data
Dec. 10, 2002 (GB) .............................................. 0228748

(51) Int. Cl.[7] .......................... F16L 21/05; F16L 15/02
(52) U.S. Cl. ........................ 277/603; 277/608; 277/630
(58) Field of Search ................. 277/603, 606, 277/608–609, 626–627, 643, 650, 630; 415/139, 170.1; 285/148.6–148.9, 331, 110

(56) References Cited

U.S. PATENT DOCUMENTS

| 625,115 | A | * | 5/1899 | Dresser ........................ 12/91 |
| 2,194,266 | A | * | 3/1940 | Allen ......................... 285/336 |
| 4,232,873 | A | * | 11/1980 | Hock ......................... 277/647 |
| 4,319,758 | A | | 3/1982 | Nicholson |
| 4,336,943 | A | | 6/1982 | Chaplin |
| 4,381,869 | A | | 5/1983 | Abbes et al. |
| 5,104,286 | A | * | 4/1992 | Donlan ..................... 415/170.1 |
| 5,362,112 | A | * | 11/1994 | Hamilton et al. ........... 285/110 |
| 5,657,998 | A | * | 8/1997 | Dinc et al. .................. 277/653 |
| 5,709,411 | A | * | 1/1998 | Bank et al. ................. 285/110 |

FOREIGN PATENT DOCUMENTS

| EP | 1 046 855 A2 | 10/2000 |
| GB | 1 534 660 | 12/1978 |
| GB | 2 303 888 A | 3/1997 |
| GB | 2 321 284 A | 7/1998 |

* cited by examiner

Primary Examiner—Heather Shackelford
Assistant Examiner—Vishal Patel
(74) Attorney, Agent, or Firm—Kirschstein, et al.

(57) ABSTRACT

Sealing elements locate an annular seal plate in an annular recess. The sealing elements are each in the form of a ring or a segment of a ring comprising a channel-shaped cross-section, the mouth of which receives the seal plate. Each sealing element is thus interposed between the seal plate and a corresponding part of a machine element such as a turbine casing in which the recesses are provided. The sealing elements protect the casing against wear caused by movement of the seal plate relative to the casing. The sealing element is of relatively low cost and is expected to be replaced when the apparatus of which it forms part is serviced.

18 Claims, 2 Drawing Sheets

SEALING ARRANGEMENTS

TECHNICAL FIELD

The invention relates to arrangements for fluid pressure sealing between adjacent machine elements such as two parts of a pressurized housing, in particular the casing of a turbomachine.

BACKGROUND OF THE INVENTION

Gas turbines and their associated compressors are operated at high temperatures and pressures and it is necessary for reasons of safety and efficiency that their housings or casings should securely contain the pressurized gases within. The housings are manufactured in several parts so an effective seal is required at the joints or junctions between those parts. Such seals must function under extreme conditions, particularly in the case of turbine housings, and must be able to accommodate relative movement between the housing parts caused by vibration and by differential thermal expansion during operation of the turbomachine.

In an existing sealing arrangement between two adjacent parts of a generally cylindrical turbine housing, one part of the housing is formed to have an annular recess facing radially inwards; and the other part of the housing is formed to have an annular recess facing radially outwards opposite the first annular recess. An annular seal plate lying in a diametric plane centered on the turbine axis has its outer edge tightly fitted into the first recess and its inner edge tightly fitted into in the second recess to form a seal between the two housing parts. This arrangement can accommodate some circumferential movement of the seal plate. To accommodate relative axial movement between the two housing parts, the recesses can be given a bird-mouth cross section or the seal plate can be given a dog-bone cross section, either of which arrangements allows the seal plate to deform from the radial plane without breaking the seal.

A problem with this known sealing arrangement is that the relative movement between the seal plate and the housings causes wear on the seal plate and in the recesses, which leads to a degraded sealing function. The seal plate can be replaced relatively easily and cheaply during regular maintenance of the gas turbine, but wear to the housing is more serious because that housing parts are large, complex and expensive components and it is desirable to replace them as infrequently as possible.

For ease of explanation, the housing was described above as "cylindrical" and the seal plate between the housing parts as "annular". Note that in the present specification, terms such as "cylindrical", "annular" and "ring" should not be limited to perfectly circular components but should be interpreted to include other closed curves where good engineering practice so permits.

SUMMARY OF THE INVENTION

The invention provides a sealing arrangement between first and second machine elements (such as adjacent portions of machine housing or casings), comprising:
  a first recess in the first machine element;
  a second recess in the second machine element, confronting the first recess across a gap;
  first and second sealing elements each comprising sheet material having a channel-shaped cross-section located in the first and second annular recesses respectively; and
  a seal plate bridging the gap and received edgewise in the channel shapes of the first and second sealing elements;
  the channel shaped cross-section of the first and second sealing elements comprising a closed end, an open end and a narrower neck portion part way between the closed end and the open end, the neck portion being sized to receive the seal plate.

Each sealing element is thus interposed between the seal plate and one of the machine elements and can protect the machine element against wear caused by movement of the seal plate. One or both sealing elements may be formed of a sufficiently soft material that it will not itself cause wear where it contacts the machine element and it can be resilient enough to accommodate the relative movement between the seal plate and the machine element. The sealing element is of relatively low cost and is expected to be replaced when the apparatus of which it forms part is serviced. It might therefore be described as a sacrificial sealing element.

As mentioned, at least one of the first and second sealing elements is advantageously formed of a resilient material and the neck portion of the channel shape is preferably sized to grip the seal plate. The channel shape of at least one of the first and second sealing elements may be convergent from the closed end to the neck and divergent from the neck to the open end. Complementary to the divergent shape of the at least one channel from the neck to the open end, the shape of at least one of the first and second annular recesses may be divergent towards its open end. In fact, at least one of the annular recesses may be provided with an inner neck portion as well, its shape being divergent towards its open end from the neck portion. The neck accommodates pivotal movement of the seal plate relative to the recess and may help to retain a suitably shaped sealing element in the recess.

The neck of the channel-shape is a position about which the seal plate can pivot to accommodate movement, without breaking the seal. Because the neck is not at the base of the channel, the resilient sealing element can be dimensioned so as to grip the seal plate tightly at the neck of the channel and provide a reliable seal.

If the width of the channel at the mouth is greater than the width of the channel at the neck, insertion of the seal plate is eased when the sealing arrangement is assembled and it also helps to accommodate pivotal movement of the seal plate relative to the sealing element.

In one embodiment of the invention, the arrangement is such that:
  the first recess is annular and opens radially inwards;
  the second recess is annular and opens radially outwards;
  the channel shapes of the first and second sealing elements extend around the circumferential extents of the first and second recesses respectively;
  the seal plate is disk-shaped,
  the open end of the first sealing element opens radially inwards to receive an outer edge of the seal plate; and
  the open end of the second sealing element opens radially outwards to receive an inner edge of the seal plate.

To enable assembly, each of the seal plates, the first sealing element and the second sealing element may comprise a ring formed in two generally semicircular halves.

In an alternative embodiment, the arrangement is such that:
  the first recess is annular and opens towards a first axial direction;
  the second recess is annular and opens towards a second axial direction opposing the first axial direction;
  the channel shapes of the first and second sealing elements extend around the circumferential extents of the first and second recesses respectively;

the seal plate is cylindrical, the open end of the first sealing element receives an first end of the seal plate; and the open end of the second sealing element receives a second end of the seal plate.

The invention also provides a sealing element for sealingly locating a seal plate in a recess, the sealing element being channel shaped in cross-section, the channel shaped cross-section comprising a closed end, an open end and a narrower neck portion part way between the closed end and the open end, the neck portion being sized to receive the seal plate. The channel may be convergent from the closed end to the neck and divergent from the neck to the open end of the channel. Preferably, the sealing element is formed of a resilient material and the neck portion of the channel shape is sized to grip the seal plate.

DETAILED DESCRIPTION OF SOME EXEMPLARY EMBODIMENTS

Figure 1:
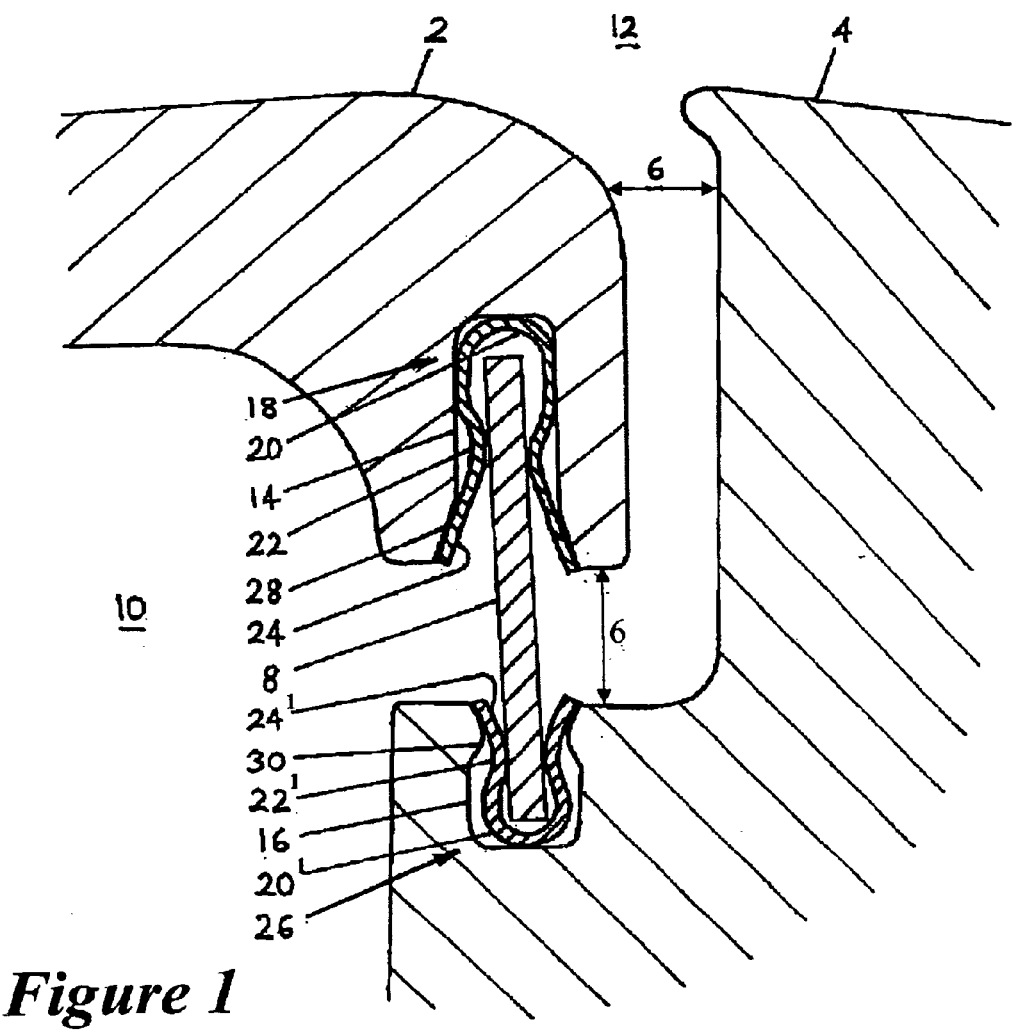
FIG. 1 is a cross section in a radially and axially extending plane through a sealing arrangement at a joint between two parts of a turbine housing in accordance with the invention.

FIG. 1 illustrates in cross section the junction or joint between a first part 2 and a second part 4 of a housing of a gas turbine. The housing is generally cylindrical about an axis of the turbine (not shown) running horizontally below the lower edge of FIG. 1. A narrow gap 6 between the first and second parts of the housing 2,4 is bridged by a seal plate 8 to separate the interior 10 of the housing from the exterior 12. The seal plate 8 is a flat ring concentric with the axis of the housing and must be sufficiently rigid to withstand the pressure difference between the housing's interior 10 and its exterior 12 without excessive deformation. The outer edge of the seal plate 8 is received in an inwardly facing annular recess 14 of the first part 2 of the housing. An outwardly facing recess 16 in the second part 4 of the housing confronts the recess 14 across the gap 6 and receives the inner edge of the seal plate 8.

Located in the first annular recess 14 and interposed between the seal plate 8 and the housing 2, is a first sealing element 18 which sealingly locates the seal plate 8 in the recess 14. Sealing element 18 is in the form of a channel shaped cross-section comprising a closed end 20, an open end 24 and a narrower neck portion 22 part way between the closed end and the open end. The neck portion 22 is sized to receive the seal plate by gripping it, and the portion of sealing element shown forms part of a complete ring having the same channel-shaped cross-section throughout, as explained later.

In more detail, the sealing element comprises a strip of material formed into a roughly "keyhole" shaped cross section as shown in FIG. 1 and curved in the dimension perpendicular to the plane of FIG. 1 to follow the curve of the recess 14. The "keyhole" shaped cross section of the sealing element comprises a channel having a rounded closed end 20 and a pair of walls that first converge to form a neck 22 that is narrower than the end 20; and are then divergent to form a flared mouth 24 of the channel that is wider than the neck 22.

Similarly located in the second recess 16 is a second sealing element 26, which has the same general "keyhole" shape as the first sealing element, having a rounded closed end $20^1$, a neck $22^1$ and a flared mouth $24^1$. The radial dimensions of the first and second sealing elements 18, 26 are matched to the depths of their respective recesses 14, 16. In this example, the first recess 14 is deeper than the second recess 16 and accordingly the first sealing element 18 has a larger radial dimension than the second sealing element 26.

In this example, the first recess 14 has a flared mouth 28 and the second recess has a neck 30, followed by a flared mouth. Either or both of the recesses 14, 16 may have a neck and/or a flared mouth.

The seal plate 8 must be very strong and wear resistant. Suitable materials include Nimonic® 90, Haynes® 25 or INCO® 718. The sealing elements 18, 26 must be compatible with the seal plate and the housing materials. For example, the sealing elements must not be so hard that they are likely to cause wear on the housing. However, the sheet material from which the sealing elements are formed may be coated on at least its seal-plate contacting surface with a wear resistant coating such as chromium carbide or Stellite®.

It will be evident that if the housing parts 2, 4, the seal plate 8 and the sealing elements 18, 26 were circumferentially continuous rings then it would not be possible to assemble the apparatus. In fact, each of the housing parts 2,4 is divided into two halves along a horizontal, axial plane to allow access to the interior of the housing during assembly and maintenance of the apparatus. Each of the components of the sealing arrangement is similarly divided into two, generally semicircular halves.

Figure 2:
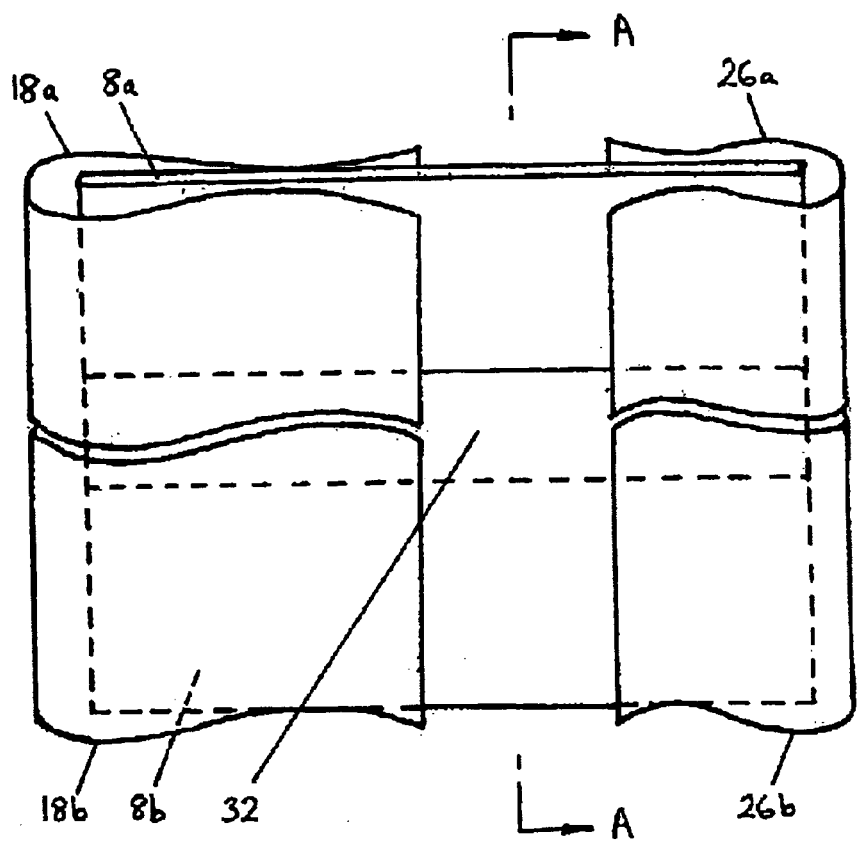
FIG. 2 is a schematic perspective view showing the relationship between two circumferentially adjacent parts of the sealing arrangement of FIG. 1, with the housing removed.
Figure 3:
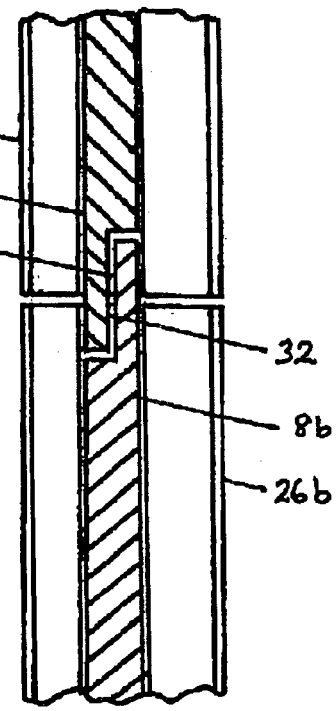
FIG. 3 is part of the cross section indicated by line A—A of FIG. 2.

FIG. 2 shows a region of the sealing arrangement close to the horizontal plane, in which the two halves 8a, 8b of the seal plate 8, the two halves 18a, 18b of the first sealing element 18 and the two halves 26a, 26b of the second sealing element 26 meet one another. For simplicity, the housing parts 2, 4 are not shown in FIG. 2 and nor is the curvature of the components about the turbine axis, which lies far to the right of FIG. 2, perpendicular to the plane of the drawing. FIG. 3 shows the same region in cross section on line A—A.

The two halves 18a, 18b of the first sealing element 18 simply abut one another, as do the two halves 26a, 26b of the second sealing element 26. If the two halves 8a, 8b of the seal plate 8 also merely abutted one another, the sealing function would likely be impaired. For this reason, the ends of the two halves 8a, 8b of the seal plate 8 are formed with complementary steps 32, which overlap one another as viewed along the axis (FIG. 2) to make the seal more effective.

It should be realised that in this embodiment, the gripping of the circumferential edges of the seal plate 8 by the neck portions 22, $22^1$ of the sealing elements is important to establish the overall sealing function of the complete sealing arrangement. It is not intended that the perimeter of the seal plate 8 should be effective to establish a seal against the closed ends 20 of the sealing elements. Instead, the seal plate should be "suspended" in the sealing elements by virtue of the gripping/clamping function of the sealing element necks on the seal plate, and this strategy—especially combined with the pressure difference across the seal plate—can achieve a highly effective seal. However, it is possible to envisage situations where an appreciable amount of flow past the seal would be desirable, and one way of achieving this could be by adjusting the strength of the gripping action exerted by the neck. Alternatively, and preferably, a more accurately metered flow through the seal could be achieved by drilling a number of holes through the seal plate. The latter option would be particularly appropriate for sealing between neighbouring housings in a gas turbine air supply system, such as a turbine cooling air system.

The assembly of the upper half of the housing and its sealing arrangement (as shown in FIGS. 1 and 2) will now be described. The lower half is assembled first in a corresponding manner. The upper half 18a of the first sealing element is pressed into the first recess 14 of the upper half of the first housing part 2. The upper half 26a of the second sealing element is pressed into the second recess 16 of the upper half of the second housing part 4. The upper half of the second housing part 4 is then positioned on the corresponding lower half (not shown), whereby the upper half 26a of the second sealing element abuts against the corresponding lower half 26b as shown in FIGS. 2 and 3.

Next the inner edge of the upper half 8a of the seal plate is pushed into the channel of the second sealing element 26, assisted by the flared mouth $24^1$. The sealing element 26 is formed from a resilient material and in a relaxed state of the sealing element 26 the neck $22^1$ of the channel is narrower than the thickness of the seal plate 8. Thus the seal plate 8 pushes the walls of the channel apart so that the neck $22^1$ of the channel grips the seal plate 8. When the upper half 8a of the seal plate is fully in place, its stepped ends 32 overlap the stepped ends 32 of the lower half 8b, as shown in FIG. 3.

Now the upper half of the first housing part 4 is lowered into place, whereby the first sealing element 18, which is retained in the first recess 14, fits over the upstanding outer edge of the seal plate 8, assisted by the flared mouth 24 of the first sealing element 18. Like the second sealing element 26, the first sealing element 18 is formed from a resilient material and in a relaxed state the neck 22 of its channel is narrower than the thickness of the seal plate 8. Thus the seal plate 8 pushes the walls of the channel apart so that the neck 22 of the channel grips the seal plate 8 and the outer surfaces of the sealing element 18 are braced against the inside of the first recess 14. When the upper half of the first housing part 2 is fully in place, the upper half 18a of the first sealing element abuts against the corresponding lower half 18b as shown in FIG. 2.

When during operation of the turbine the two housing parts 2,4 move axially with respect to one another, the seal plate 8 can deflect from a plane to a shallow cone, pivoting about the lines defined by the necks 22, $22^1$ of the first and second sealing elements 18,26. The edges of the seal plate 8 have room to move axially or radially within the relatively wide bases 20 of the channels in the sealing elements 18,26. The sealing elements can also flex resiliently to accommodate this movement. Relative circumferential movement between the two housing parts 2, 4 can be accommodated by the sliding contact between the seal plate 8 and the necks 22, $22^1$ of the sealing elements 18,26. The material from which the sealing elements 18,26 are made is not so hard as the seal plate 8 and therefore acts as a cushion between the seal plate 8 and the housing parts 2,4 to cut down wear.

Figure 4:
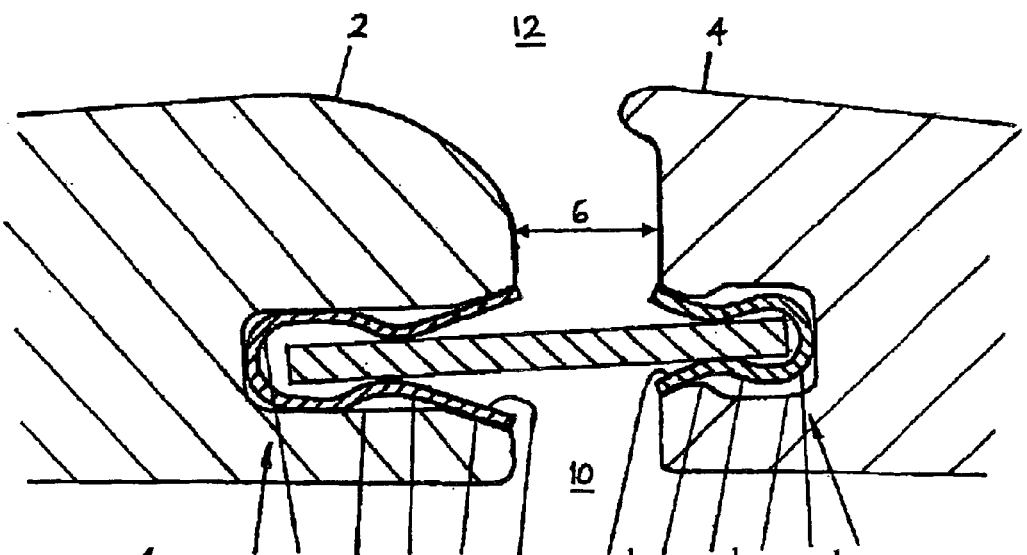
FIG. 4 is a cross section similar to FIG. 1 of an alternative embodiment of a sealing arrangement in accordance with the invention.

FIG. 4 illustrates an alternative embodiment of the invention, using the same reference numerals for the corresponding parts as in FIGS. 1 to 3. The view corresponds to that in FIG. 1, with the axis of the housing running horizontally below the lower edge of the Figure. In this embodiment, the seal plate 8 is not planar but takes the form of a short cylinder, concentric about the axis. Thus, as shown, the cross section of the seal plate 8 is not radial but is parallel to the axis. To accommodate this, the annular recesses 14, 16 of the first and second housing parts 2, 4 face one another axially. The mouths 24 of the channels of the sealing elements 18, 26 also open axially to receive the respective edges of the seal plate 8.

In this alternative embodiment, it may not be necessary to split the components of the sealing arrangement into halves in order to assemble it. If the shape of the other parts of the gas turbine will allow, the housing parts 2, 4, the sealing elements 18, 26 and the seal plate 8 may all be formed as unbroken rings, which can be assembled by bringing them axially along from the end of the turbine in the following sequence: first housing part 2, first sealing element 18, seal plate 8, second sealing element 26, second housing part 4. Evidently the unbroken seal plate 8 and sealing elements 18,26 are able to provide a better seal than in the embodiment of FIGS. 2 and 3.

Although the above embodiments have been described in terms of co-axial annular, semi-annular, circular and semi-circular section components, etc., it would of course be possible to divide the sealing elements, the seal plate and even the housing into segments of circles, though this would probably cause increased leakage past the seal arrangement. Furthermore, it may be possible to use the principle of the invention to seal between adjacent otherwise curved or linearly extending components that are subject to limited relative movement transverse of the seal arrangement.

I claim:

1. A sealing arrangement between first and second machine elements, comprising:
    a) a first recess in the first machine element;
    b) a second recess in the second machine element, and confronting the first recess across a gap;
    c) first and second sealing elements each comprising sheet material having a channel-shaped cross-section located in the first and second annular recesses respectively; and
    d) a seal plate bridging the gap and received edgewise in the channel shapes of the first and second sealing elements;
    e) the channel-shaped cross-section of the first and second sealing elements comprising a closed end, an open end and a neck portion part way between the closed end and the open end, the neck portion being narrower than the closed end and the open end and sized to receive the seal plate.

2. The sealing arrangement according to claim 1, wherein at least one of the first and second sealing elements is formed of a resilient material and the neck portion of the channel shape is sized to grip the seal plate.

3. The sealing arrangement according to claim 1, wherein:
    the first recess is annular and opens radially inwards;
    the second recess is annular and opens radially outwards;
    the channel shapes of the first and second sealing elements extend around the circumferential extents of the first and second recesses respectively;
    the seal plate is disk-shaped;
    the open end of the first sealing element opens radially inwards to receive an outer edge of the seal plate; and
    the open end of the second sealing element opens radially outwards to receive an inner edge of the seal plate.

4. The sealing arrangement according to claim 1, wherein:
the first recess is annular and opens towards a first axial direction;
the second recess is annular and opens towards a second axial direction opposing the first axial direction;
the channel shapes of the first and second sealing elements extend around the circumferential extents of the first and second recesses respectively;
the seal plate is cylindrical;
the open end of the first sealing element receives a first end of the seal plate; and
the open end of the second sealing element receives a second end of the seal plate.

5. The sealing arrangement according to claim 1, wherein the first and second machine elements comprise two parts of a pressurized housing.

6. The sealing arrangement according to claim 5, wherein the pressurized housing comprises a casing of a turbomachine.

7. The sealing arrangement according to claim 1, wherein the first and second sealing elements comprise walls of substantially constant thickness that define the channel-shaped cross-section.

8. The combination of a recess in a machine element and a sealing element located in the recess for sealingly locating a seal plate in the recess, the sealing element being channel-shaped in cross-section, the channel-shaped cross-section comprising a closed end, an open end and a neck portion part way between the closed end and the open end, the neck portion being narrower than the closed end and the open end and sized to receive the seal plate.

9. The combination according to claim 8, wherein the channel is convergent from the closed end to the neck portion and divergent from the neck portion to the open end of the channel.

10. The combination according to claim 9, wherein the sealing element is formed of a resilient material and the neck portion of the channel shape is sized to grip the seal plate.

11. The combination according to claim 8, wherein the machine element comprises part of a pressurized housing.

12. The combination according to claim 11, wherein the pressurized housing comprises a casing of a turbomachine.

13. The combination according to claim 8, wherein the sealing element comprises walls of substantially constant thickness that define the channel-shaped cross-section.

14. A sealing arrangement between first and second machine elements, comprising:
a) a first recess in the first machine element;
b) a second recess in the second machine element, and confronting the first recess across a gap;
c) first and second sealing elements each comprising sheet material having a channel-shaped cross-section located in the first and second annular recesses respectively; and
d) a seal plate bridging the gap and received edgewise in the channel shapes of the first and second sealing elements;
e) the channel-shaped cross-section of the first and second sealing elements comprising a closed end, an open end and a narrower neck portion part way between the closed end and the open end, the neck portion being sized to receive the seal plate, the channel shape of at least one of the first and second sealing elements being convergent from the closed end to the neck portion and divergent from the neck portion to the open end.

15. The sealing arrangement according to claim 14, wherein the shape of at least one of the first and second recesses is divergent towards its open end.

16. The sealing arrangement according to claim 15, wherein the shape of at least one of the first and second recesses is divergent towards its open end from an inner neck port.

17. A sealing arrangement between first and second machine elements, comprising:
a) a first annular recess in the first machine element and opening radially inwards;
b) a second annular recess in the second machine element and opening radially outwards, and confronting the first recess across a gap;
c) first and second sealing elements each comprising sheet material having a channel-shaped cross-section located in the first and second annular recesses respectively, the channel shapes of the first and second sealing elements extending around the circumferential extents of the first and second recesses respectively; and
d) a disk-shaped seal plate bridging the gap and received edgewise in the channel shapes of the first and second sealing elements, the open end of the first sealing element opening radially inwards to receive an outer edge of the seal plate, and the open end of the second sealing element opening radially outwards to receive an inner edge of the seal plate;
e) the channel-shaped cross-section of the first and second sealing elements comprising a closed end, an open end and a narrower neck portion part way between the closed end and the open end, the neck portion being sized to receive the seal plate, each of the seal plates, the first sealing element and the second sealing element comprising a ring formed in two generally semicircular halves.

18. The sealing arrangement according to claim 17, wherein a junction between two adjacent parts of the seal plate has a stepped configuration such that the two parts overlap.

* * * * *